J. H. CORLISS.
Combined Tanks and Liquid Measures.

No. 145,725. Patented Dec. 23, 1873.

Witnesses
John L. Borne
C. M. Richardson

Joseph H. Corliss
by Dewey & Co.
Attys

UNITED STATES PATENT OFFICE.

JOSEPH H. CORLISS, OF RENO, NEVADA.

IMPROVEMENT IN COMBINED TANKS AND LIQUID-MEASURES.

Specification forming part of Letters Patent No. 145,725, dated December 23, 1873; application filed August 23, 1873.

*To all whom it may concern:*

Be it known that I, JOSEPH H. CORLISS, of Reno, Washoe county, State of Nevada, have invented a Vessel for Measuring and Drawing Liquids; and I do hereby declare that the following description and accompanying drawings are sufficient to enable any person skilled in the art or science to which it most nearly appertains to make and use my said invention without further invention or experiment.

The object of my invention is to provide a novel vessel for measuring and drawing liquids; and it consists principally in the employment of certain details of construction, as more fully hereinafter described, with a series of stationary measures of different sizes, which are so connected with the containing can or vessel that, by simply moving a suitably-connected lever, either of the measures can be filled, and after closing the communication with the containing-can the contents can be drawn off by a cock.

Figure 1:
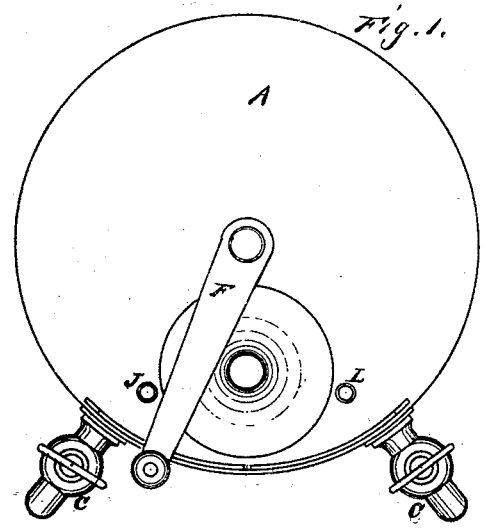
Figure 2:
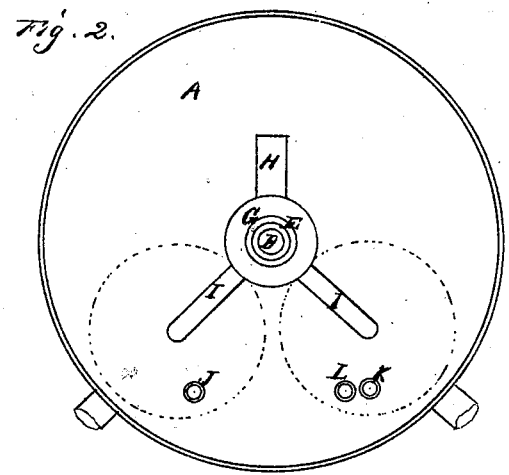
Figure 3:
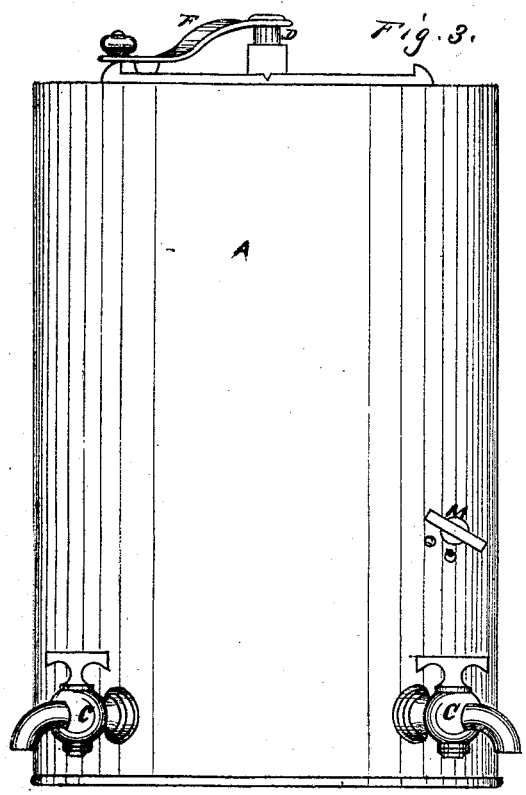
Figure 4:
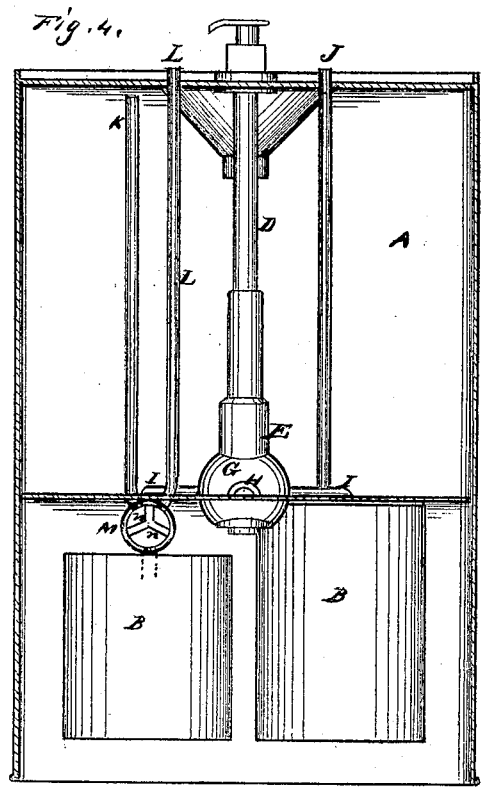

Referring to the accompanying drawings for a more complete explanation of my invention, Figure 1 is a top view of my vessel. Fig. 2 is a horizontal section taken through the containing-vessel. Fig. 3 is a side elevation. Fig. 4 is a vertical section.

A is a containing-vessel of any capacity. Beneath the bottom of this vessel is a space within which are placed the measures B B. Any number which may be desired or needed can be used, and these measures are, preferably, soldered or otherwise secured to the bottom of the containing-vessel around its periphery, and faucets C serve to discharge their contents when desired.

Through the top of vessel A a stem, D, passes down to the bottom in the center, and this stem operates the plug E of the cock G, being turned from side to side by a lever or handle, F, upon the top of the vessel or tank A. The cock G has as many passages as there may be measures, in the manner of a one, two, or three way cock. H is the inlet-passage from the tank, and I I are the outlet-passages opening through the bottom of the tank, and leading from the cock to the measures.

If preferred, the cock and pipes may be arranged below the bottom of the tank. A single tube, J, may open into the top of the measure and lead upward through the tank, in order to supply air to the measure, and a hole, O, supplies air to the tank, so that the liquid will flow; but, as this tube will always fill to the height of the liquid in the tank, and thus add so much to the amount in the measure each time, I prefer to employ two tubes, K and L, one of which has its upper end opening just beneath the top of the tank inside, while the other passes up through the top, as shown. These two pipes both connect with a stop-cock, $m$, having passages $n$, as shown, which serve to connect the measure alternately with the pipe K or L.

The operation will be as follows: The lever F being moved so as to open communication from the tank through the passages H and I to the measure, the cock $m$ is turned, so that the air in the measure may escape into the upper part of the tank, until the measure is filled. The pipe K will also be filled to the level of the liquid in the tank; the cock $m$ is then turned so as to open communication with the pipe L, and when the discharge-cock is opened air from the outside will supply the space left by the discharge of the liquid, while the oil in the pipe K will be retained there by the closing of the passage in that direction.

By this construction I am enabled to measure exactly and deliver expeditiously, with no necessity of many loose measures standing about, the whole arrangement being very simple, economical, and cleanly.

Having thus described my invention, what I claim, and desire to secure by Letters Patent, is—

In combination with the measure B and tank A, the cock G, with its passages H and I, stem D, operating-lever F, pipes K and L, and cock $m$, all constructed, arranged, and operating as described.

In witness whereof I hereunto set my hand and seal.

JOSEPH H. CORLISS. [L. S.]

Witnesses:
 JOHN L. BOONE,
 C. M. RICHARDSON.